United States Patent
Saneshige

(10) Patent No.: US 8,704,851 B2
(45) Date of Patent: Apr. 22, 2014

(54) IMAGE GENERATING APPARATUS, PROGRAM, MEDIUM, AND METHOD FOR CONTROLLING A TILT ANGLE OF A VIRTUAL CAMERA

(75) Inventor: Hidetaka Saneshige, Tokyo (JP)

(73) Assignee: Kabushiki Kaisha Square Enix, Tokyo (JP)

(*) Notice: Subject to any disclaimer, the term of this patent is extended or adjusted under 35 U.S.C. 154(b) by 1304 days.

(21) Appl. No.: 12/241,511

(22) Filed: Sep. 30, 2008

(65) Prior Publication Data

US 2009/0092286 A1    Apr. 9, 2009

(30) Foreign Application Priority Data

Oct. 3, 2007 (JP) ................. 2007-259316

(51) Int. Cl.
*G09G 5/00* (2006.01)
*G09G 5/14* (2006.01)
*G06T 11/00* (2006.01)
*G06T 11/60* (2006.01)
*G06T 19/00* (2011.01)

(52) U.S. Cl.
CPC *G09G 5/14* (2013.01); *G06T 11/00* (2013.01); *G06T 11/60* (2013.01); *G06T 19/00* (2013.01); *G06T 19/006* (2013.01)
USPC ........... 345/629; 345/630; 345/631; 345/632; 345/633; 345/634; 345/635; 345/636; 345/637; 345/638; 345/650; 345/676

(58) Field of Classification Search
CPC .......... G09G 5/14; G06T 11/00; G06T 11/60; G06T 19/00; G06T 19/006
USPC ................. 345/418–427, 629–639, 650, 676; 463/32
See application file for complete search history.

(56) References Cited

U.S. PATENT DOCUMENTS

| | | | |
|---|---|---|---|
| 7,628,698 B2 * | 12/2009 | Ajioka et al. | 463/33 |
| 2002/0075264 A1 * | 6/2002 | Iizuka et al. | 345/427 |
| 2002/0089521 A1 | 7/2002 | Maruyama et al. | |
| 2006/0004282 A1 | 1/2006 | Oosawa | |
| 2006/0046803 A1 | 3/2006 | Suzuki | |

(Continued)

FOREIGN PATENT DOCUMENTS

JP    2004-3451572    12/2004

OTHER PUBLICATIONS

English language Abstract of JP 2004-3451572, Dec. 2, 2004.

*Primary Examiner* — Jin-Cheng Wang
(74) *Attorney, Agent, or Firm* — Greenblum & Bernstein, P.L.C.

(57) ABSTRACT

When an obstacle does not exist in a horizontal direction, a PC coordinate is set as a point of gaze. When the player character comes close to a high wall such that the obstacle exists in the horizontal direction, a first virtual straight line that has a predetermined length and intersects with the wall is set in the predetermined direction. A second virtual straight line that has the predetermined length and extends in an opposite direction is set at an intersection point of the first virtual straight line and the face of the wall. Next, it is determined whether the second virtual straight line intersects with another obstacle. When the second virtual straight line does not intersect with another obstacle, the coordinate of the tip end of the second virtual straight line is set as the point of gaze.

19 Claims, 5 Drawing Sheets

(56) References Cited

U.S. PATENT DOCUMENTS

| | | | |
|---|---|---|---|
| 2006/0094503 A1* | 5/2006 | Ajioka et al. | 463/32 |
| 2006/0209068 A1* | 9/2006 | Ajioka et al. | 345/427 |
| 2006/0258449 A1 | 11/2006 | Yasui et al. | |
| 2007/0206003 A1 | 9/2007 | Yoshida et al. | |
| 2008/0113792 A1* | 5/2008 | Yamada et al. | 463/30 |
| 2010/0041478 A1* | 2/2010 | Ajioka et al. | 463/32 |
| 2010/0045664 A1* | 2/2010 | Ishida | 345/419 |

* cited by examiner

IMAGE GENERATING APPARATUS, PROGRAM, MEDIUM, AND METHOD FOR CONTROLLING A TILT ANGLE OF A VIRTUAL CAMERA

CROSS REFERENCE TO RELATED APPLICATION

The present disclosure relates to subject matter contained in Japanese Patent Application No. 2007-259316, filed on Oct. 3, 2007, the disclosure of which is expressly incorporated herein by reference in its entirety.

BACKGROUND OF THE INVENTION

1. Field of the Invention

The present invention relates to an image generating apparatus, image generating program, image generating program recording medium and image generating method. Specifically, the present invention relates to an image generating apparatus that displays an image of a virtual three-dimensional space on a display screen.

2. Description of the Related Art

Conventionally, a video game apparatus is known, which displays a virtual three-dimensional space, a player character that moves in accordance with an operation input by a player and other objects in the three-dimensional space. Such video game apparatus places a virtual camera in the virtual three-dimensional space and generates an image of a range viewed with the virtual camera as a viewpoint. In this case, a cross point of a visual axis of the virtual camera with a predetermined angle and an object in the three-dimensional space is set as a point of gaze. The video camera moves to follow the player character with such point of gaze being set on the player character. Thus, a video game advances while always displaying the player character in the virtual three-dimensional space.

As game advances, the situation may occur sometimes in which an obstacle object such as a wall exists between the virtual camera and the player character along the visual axis and the player character exists near the wall and the like.

In this case, as shown in FIG. 1A, a virtual camera 62 is moved away from a wall 26 towards a player character 65. At the same time, the angle of a visual axis L of the virtual camera 62 is changed to vertical direction to set the point of gaze on the player character 65. Thus, as shown in FIG. 1A', the player character 65 is displayed on a display screen 61 without being interrupted by the wall.

However, when the angle of the visual axis L of the virtual camera 62 is changed in the virtual direction from the normal angle, a visual field V of the virtual camera 62 is also changed in the vertical direction, and thereby an enemy character 67 is kept outside of the visual field V. As a result, as shown in FIG. 1A', the enemy character 67 is not displayed on the display screen 61.

In view of the above, Japanese Unexamined Patent Publication No. 2004-3451572 describes using two virtual cameras, i.e., one virtual camera which is used in normal times and another virtual camera, and generating an image using the other virtual camera switched from the virtual camera used in the normal times so as to display the image that is not interrupted by obstacle objects.

However, an image processing procedure may become complicated because of generating images by switching the virtual camera to be used from one used in the normal times to another as described in the above-mentioned Japanese Unexamined Patent Publication.

SUMMARY OF THE INVENTION

The present invention has been made in view of the conventional problem as described above. It is an object of the invention to provide an image generating apparatus, image generating program, image generating program recording medium and image generating method, which is able to display a three-dimensional image that covers a wide range of area around a player character by using a single camera even when the player character comes close to an obstacle object such as a wall.

In order to achieve heretofore described object, according to a first aspect of the invention, there is provided an image generating apparatus that generates an image of a virtual three-dimensional space of a visual field of a virtual camera while having a point of gaze of the virtual camera follow a player character that moves in accordance with an operation input by a player. The image generating apparatus includes a first virtual straight line setting system that sets a first virtual straight line having a predetermined length and extending from the point of gaze in a horizontal direction in a positional direction of the virtual camera. The image generating apparatus further includes a first determining system that determines whether the first virtual straight line intersects with an object other than the player character in the virtual three-dimensional space. The image generating apparatus further includes a second virtual straight line setting system that sets a second virtual straight line having a predetermined length and extends in an opposite direction of the first virtual straight line from an intersection point of the first virtual straight line and the object, when the first determining system determines that the first virtual straight line intersects with the object. The image generating apparatus further includes a controller that controls a direction of the virtual camera so that the point of gaze coincides with a tip end of the second virtual straight line.

The image generating apparatus may further include a second determining system that determines whether the second virtual straight line intersect with the object. In the apparatus, when the second determining system determines that the second virtual straight line intersects with the object, the controller controls the direction of the virtual camera so that the point of gaze coincides with an intersection point of the second virtual straight line and the object.

In the image generating apparatus, the intersection point may be a point at which the first virtual straight line intersects with a first face of the object.

In the image generating apparatus, the controller may control the direction of the virtual camera so that the point of gaze coincides with a top of the player character in normal times when the first determining system determines that the first virtual straight line does not intersect with the object.

In the image generating apparatus, the object may be an obstacle object other than the player character.

According to a second aspect of the present invention, there is provided an image generating program executed in a computer of an image generating apparatus that generates an image of a virtual three-dimensional space of a visual field of a virtual camera while having a point of gaze of the virtual camera follow a player character that moves in accordance with an operation input by a player. The program causes the computer to function as a first virtual straight line setting system that sets a first virtual straight line having a predetermined length and extending from the point of gaze in a horizontal direction in a positional direction of the virtual camera. The computer further causes the computer to function as a first determining system that determines whether the first virtual straight line intersects with an object other than the player character in the virtual three-dimensional space. The computer further causes the computer to function as a second virtual straight line setting system that sets a second virtual straight line having a predetermined length and extends in an opposite direction of the first virtual straight line from an intersection point of the first virtual straight line and the object, when the first determining system determines that the first virtual straight line intersects with the object. The computer further causes the computer to function as a controller that controls a direction of the virtual camera so that the point of gaze coincides with a tip end of the second virtual straight line.

According to a third aspect of the present invention, there is provided a computer-readable recording medium recording an image generating program executed in a computer of an image generating apparatus that generates an image of a virtual three-dimensional space of a visual field of a virtual camera while having a point of gaze of the virtual camera follow a player character that moves in accordance with an operation input by a player. The program causes the computer to function as a first virtual straight line setting system that sets a first virtual straight line having a predetermined length and extending from the point of gaze in a horizontal direction in a positional direction of the virtual camera. The program further causes the computer to function as a first determining system that determines whether the first virtual straight line intersects with an object other than the player character in the virtual three-dimensional space. The program further causes the computer to function as a second virtual straight line setting system that sets a second virtual straight line having a predetermined length and extends in an opposite direction of the first virtual straight line from an intersection point of the first virtual straight line and the object, when the first determining system determines that the first virtual straight line intersects with the object. The program further causes the computer to function as a controller that controls a direction of the virtual camera so that the point of gaze coincides with a tip end of the second virtual straight line.

According to a fourth aspect of the present invention, there is provided an image generating method for generating an image of a virtual three-dimensional space of a visual field of a virtual camera while having a point of gaze of the virtual camera follow a player character that moves in accordance with an operation input by a player. The image generating method includes setting a first virtual straight line having a predetermined length and extending from the point of gaze in a horizontal direction in a positional direction of the virtual camera. The method further includes determining whether the first virtual straight line intersects with an object other than the player character in the virtual three-dimensional space. The method further includes setting a second virtual straight line having a predetermined length and extends in an opposite direction of the first virtual straight line from an intersection point of the first virtual straight line and the object, when it is determined that the first virtual straight line intersects with the object. The method further includes controlling a direction of the virtual camera so that the point of gaze coincides with a tip end of the second virtual straight line.

With such a configuration, there is no need to switch the virtual camera used in normal times to another virtual camera even when the player character comes close to an obstacle object.

Accordingly, even when the player character comes close to an obstacle object, it is possible to adequately display an area around the player character. Thus, the user is able to grasp the arrangement and/or movement of the player character and other objects.

DESCRIPTION OF THE PREFERRED EMBODIMENTS

An embodiment of the present invention will be explained below with reference to the drawings. In this embodiment, a household game machine is used as an example.

Figure 2:
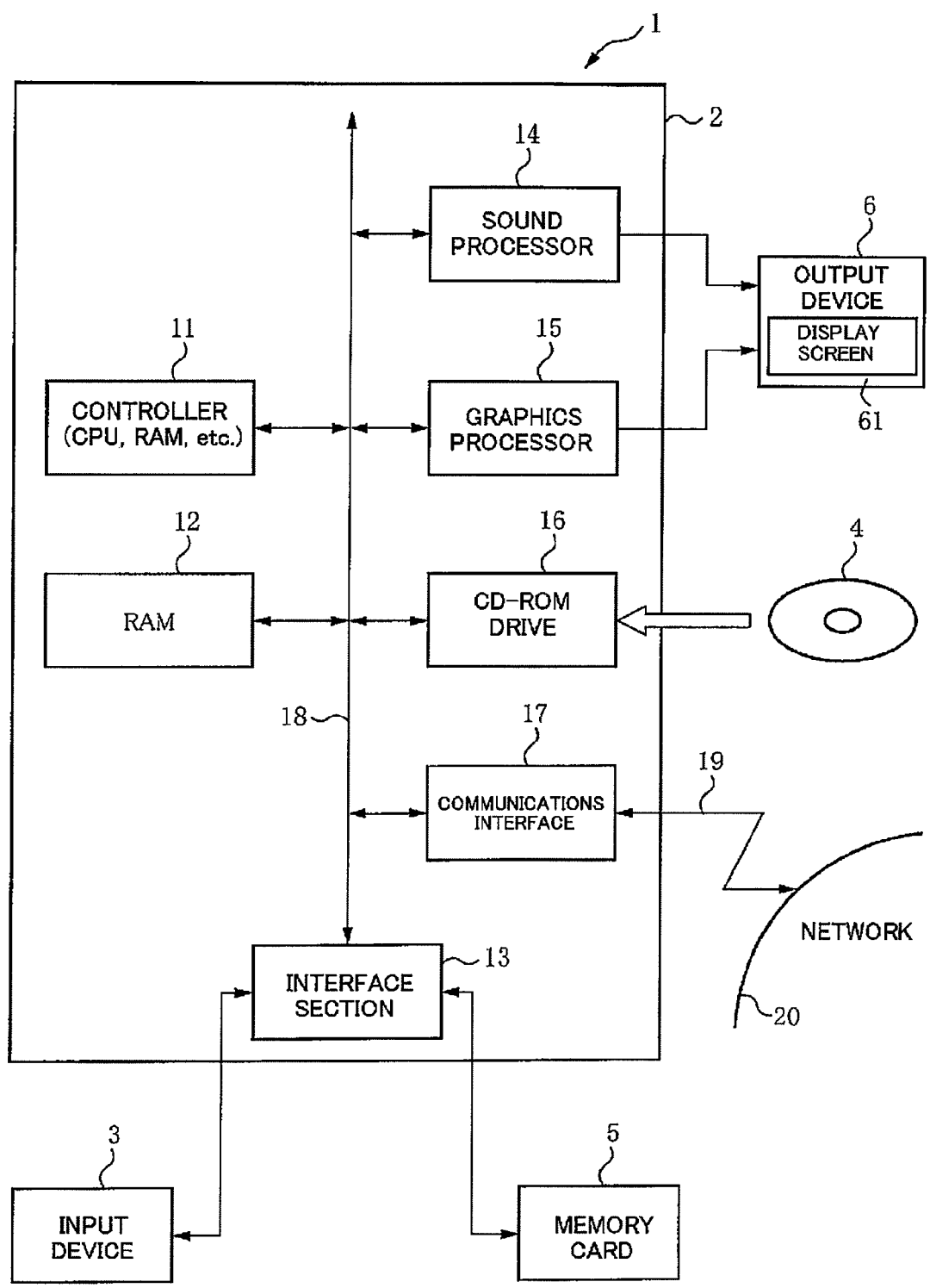
FIG. 2 is a hardware block diagram showing an overall configuration of a video game apparatus according to an embodiment of the present invention.

FIG. 2 is a block diagram showing a configuration of a video game apparatus. As shown in FIG. 2, a video game apparatus 1 includes a video game apparatus main body 2, an input device 3, a memory card 5 and a compact disc read only memory (CD-ROM) 4 and a output device 6.

The video game apparatus main body 2 includes a controller 11, a random access memory (RAM) 12, an interface section 13, a sound processor 14, a graphic processor 15, a CD-ROM drive 16, the removable CD-ROM 4, and communications interface 17. All of these components are connected with each other via a bus 18.

A controller 11 includes a central processing unit (CPU), a read only memory (ROM) and the like. The ROM records basic program such as a boot program and an operating system. The controller 11 sequentially executes the programs recorded in the RAM 12 to perform the processing for advancing the game. The controller 11 also controls the operation of the components 12 to 17 in the video game apparatus main body 2.

The RAM 12 is used as a main memory of the video game apparatus main body 2, and stores programs and data necessary for advancing the video game. The programs and data are transferred from the CD-ROM 4. The RAM 12 is also used as a work area when the program is executed. Areas allocated in the RAM 12 and data stored in each area will be described later.

The interface section 13 removably connects to the input device 3 and the memory card 5. The interface section 13 controls the transmission/reception of data from/to the input device 3 and the memory card 5 and the controller 11 and the RAM 12. The input device includes a direction key and various buttons. The player operates the direction key and buttons to input an instruction for the player character's movement or actions necessary for advancing the game. The memory card 5 stores data indicating a game progress condition.

The sound processor 14 executes processing for reproducing sound data such as back ground music (BGM) and effect sounds in accordance with the game being executed in response to the instruction from the controller 11, and outputs sound signals to the output device 6.

The graphic processor 15 executes a three-dimensional graphic data processing and generates graphic data in accordance with the game being executed. The graphic processor 15 adds a predetermined synchronization signal to the generated graphic data to generate a video signal and outputs the video signal to the output device 6.

The CD-ROM drive 16 drives the CD-ROM 4 set in the video game apparatus main body 2 in response to the instruction from the controller 11, and transfers the programs and data stored in the CD-ROM 4 to the RAM 12 via the bus 18.

The communications interface 17 is connected to an external network 20 via a communications line 19, and execute a processing for transmitting/receiving programs and data to/from the external network 20.

The CD-ROM 4 stores program and data necessary for advancing the video game. The CD-ROM drive 16 drives the CD-ROM 4 and read the programs and data stored therein. The programs and data read from the CD-ROM 4 are transferred to the CD-ROM drive 16 to the RAM 12 via the bus 18.

The output device 6 includes the display screen 61 that displays images corresponding to the video signal from the graphics processor 15. The display screen 61 may be composed of, for example, a cathode ray tube (CRT). The output device also includes a speaker (not shown) that outputs sounds corresponding to the sound signal from the sound processor 14. A television receiver is generally used as the output device 6, Next, the areas allocated in the RAM 12 of FIG. 2 and data stored in the respective areas will be explained in detail.

Figure 3:
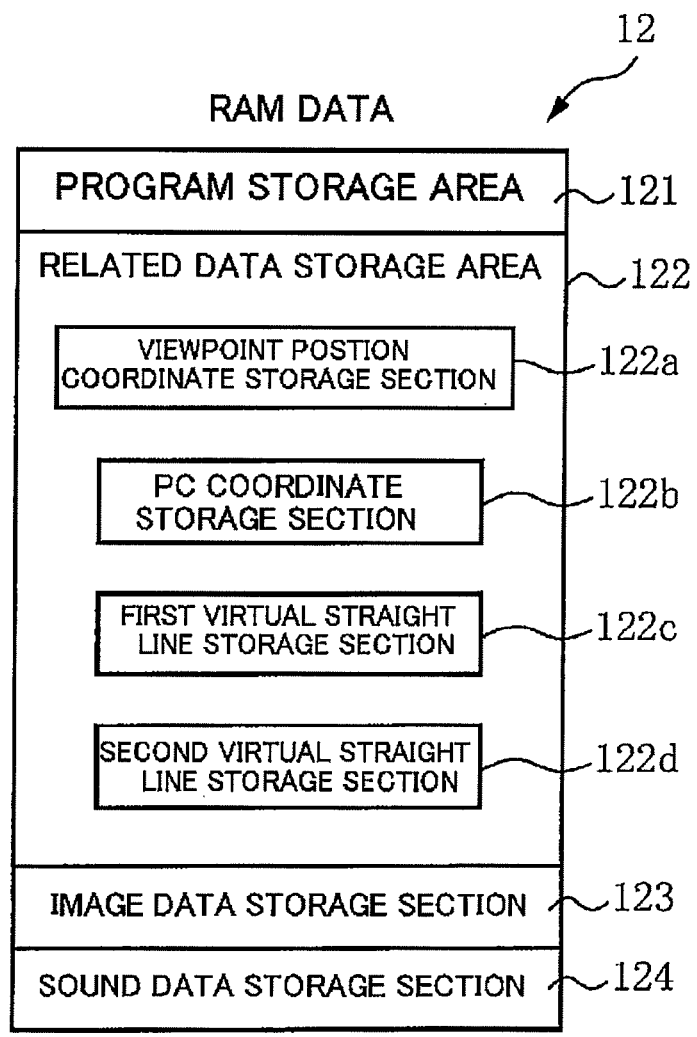
FIG. 3 is a memory map for showing areas allocated in a RAM of FIG. 2.

FIG. 3 is a diagram showing the areas allocated in the RAM 12. As shown in FIG. 3, a program storage area 121, a related data storage area 122, an image data storage area 123 and a sound data storage area 124 are allocated in the RAM 12. The programs and data stored in the respective storage areas 121 to 124 are read from the CD-ROM 4 by the CD-ROM drive 16 and transferred to the RAM 12. On the other hand, the data in the related data storage area is calculated by the controller 11 in the game progress and transferred to the RAM 12.

The program storage area 121 stores programs necessary for executing the game, which programs are shown in the flowchart described later. The related data storage area 122 includes a viewpoint position coordinate storage section 122a, a player character (PC) coordinate storage section 122b, a first virtual straight line storage section 122c and a second virtual straight line storage section 122d.

Figure 4:
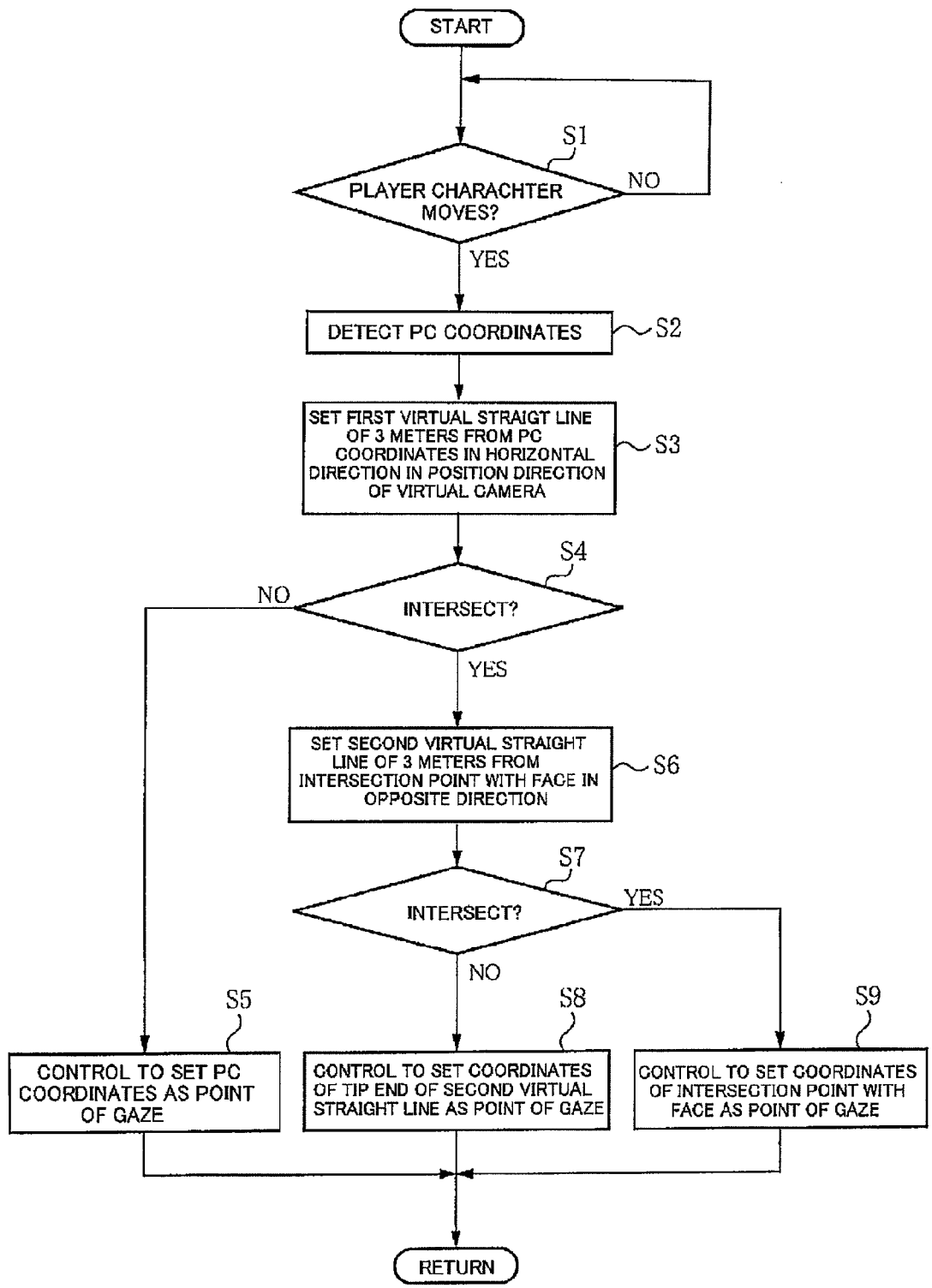
FIG. 4 is a flowchart showing a processing procedure according to an embodiment of the present invention.

The viewpoint position coordinate storage section 122a stores position information of a viewpoint for displaying an image on the display screen 61, that is, position coordinates (X1,Y1,Z1) of the virtual camera 62 in the three-dimensional space shown in FIG. 4. The PC coordinate storage section 122b stores coordinates (X2, Y2, Z2) of a top of the player character 65 displayed on the display screen 61. The first straight line storage section 122c stores coordinates (X3, Y3, Z3) of a base end 63a of a first virtual line 63 and coordinates (X4,Y4, Z4) of a tip end 63b. The second virtual line storage section 122d stores coordinates (X5, Y5, Z5) of a base end 64a of a second virtual line 64 and coordinates (X6,Y6, Z6) of a tip end 64b.

As shown in figure, the virtual camera 62 is positioned obliquely upward of the player character 65.

In this embodiment as configured as above, when the game starts, the controller 11 provides an area for storing information in the RAM 12. Thus, the program storage area 121, the related data storage area 122, the image data storage area 123, the sound data storage area 124 and the like are provided in the RAM 12 as shown in FIG. 3. When a request for starting a game is issued, data necessary for the game to be started is read to the RAM 12 from the CD-ROM 4. The controller 11 display images on the display screen 61 based upon the game program read to the RAM 12. The player makes the player character to move by operating the key and buttons of the input device 3 based upon the images on the display screen 61 to advance the game. The images configured of the virtual three-dimensional space view from the viewpoint, i.e., the virtual camera are kept to being displayed on the display screen 61 during the game being progressed.

While the images configured of the virtual three-dimensional space are displayed on the display screen 61, the controller 11 executes a processing in accordance with a flowchart shown in FIG. 4 based upon the game program stored in the RAM 12. The controller 11 always monitors whether the player character moves in the virtual three-dimensional space (step S1). When the controller 11 determines that the player character 65 moves (step S1; YES), the controller 11 detects the PC coordinates (X2, Y2, Z2) of the player character that has moved, and stores the detected PC coordinates in the PC coordinate storage section 122b (step S2).

Next, the controller 11 sets the first virtual straight line 63, which extends from the detected PC coordinates (X2,Y2, Z2) in a horizontal direction towards the position of the virtual camera 62 (X1,Y1, Z1) and has a length of three meters (step S3).

In other words, as the position coordinates (X1,Y1,Z1) of the virtual camera 62 and the position coordinates (X2, Y2, Z2) of the player character 65 are respectively stored in the viewpoint position coordinate storage section 122a and the PC coordinate storage section 122b, it is possible to detect the positional direction of the virtual camera 62 from the player character 65 and to specify a horizontal direction in the positional direction of the virtual camera 62. Further, the "3 meter" is a value defined in the three-dimensional space. For example, a height of the player character 65 is defined to be "two meters" as a reference value, and the length of "three meters" is set based upon the reference value "two meters". That is, the length is set based upon the definition in the virtual three-dimensional space.

Further, the length of the first virtual straight line 63, i.e., three meters, which corresponds to a maximum distance from the wall, is calculated by the following equation.

$$d = h \cdot \tan(\cdot/2)$$

where d is the maximum distance from the wall, h is a distance (height) in a vertical direction between the virtual camera 62 and a top of the player character 65, which distance corresponds to the reference value "two meters", and is a view angle of the virtual camera 62.

Figure 5A:
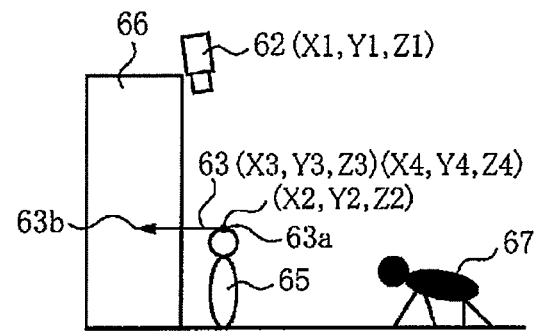
FIG. 5 is an operation explanatory diagram according to an embodiment of the present invention.

Thus, at step S3, the first virtual straight line 63 (X3, Y3, Z3), (X4, Y4, Z4) is set, whose coordinates of the base end 63a and tip end 63b are respectively (X3, Y3, Z3) and (X4, Y4, Z4), as shown in FIG. 5A. The first virtual straight line 63 is a virtual line, and therefore it is not displayed on the display screen 61. Here, (X3, Y3, Z3) equal to (X2, Y2, Z2).

Next, it is determined whether the first virtual straight line 62 intersects with obstacle objects such as a wall (step S4). As the coordinates (X3,Y3, Z3) equal to (X2,Y2, Z2), and as the first virtual straight line 63 is a same height as the height of the player character 62 in a horizontal direction, it is determined to be "NO" at step S4, when no obstacles (objects) as high as or higher than the player character 65 exist in horizontal direction in the direction to the virtual camera 62.

Figure 1A:
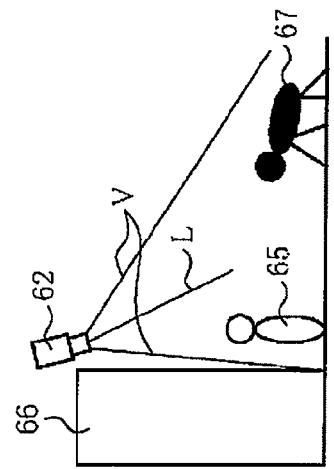
FIGS. 1A and 1A' are diagrams showing a problem of the prior art.

Then, the proceeding proceeds from step S4 to step S5, and the point of gaze is set at the PC coordinates (X2,Y2, Z2). The point of gaze is a point A at which the visual axis L first intersects with the object as also shown in FIG. 1A. Thus, at step S5, the point of gaze of the virtual camera 62 is set at the top of the player character 65, and the virtual three-dimensional image viewed with the point of gaze A of the virtual camera being set at the top of the player character 65 is displayed on the display screen 61.

When it is determined to be "NO" at step S4, the procedure of S1-S2-S3-S4-S5-S1 is executed repeatedly. In other words, the virtual three-dimensional image with the point of gaze A being set at the PC coordinates (X2, Y2, Z2) of the player character 65 is always displayed on the display screen 61 in normal times.

While the procedure of S1-S2-S3-S4-S5-S1 is executed repeatedly, the player character moves close to the wall 66, which is higher than the player character 65, the first virtual line 63 intersects with the wall 66 serving as an obstacle, shown in FIG. 5A. Accordingly, it is determined to be "YES" at step S4, and the processing proceeds from step S4 to step S6.

Next, at step S6, a second virtual line 64 having a length of three meters is set, which extends in the opposite direction of the first virtual straight line 63 from the intersection point of the first virtual straight line 63 and a face of the obstacle (wall 66). That is, the coordinates of the intersection point of the first virtual straight line 63a and the face of the obstacle is detected based upon the coordinates (X3, Y3, Z3) of base end 63a of the first virtual straight line 63 and the coordinates (X4, Y4, Z4) of the tip end 63b stored first virtual straight line storage section 122c. Further, the length of "three meters" is set based upon the reference value as described above, and is calculated by the foregoing equation.

Figure 5B:
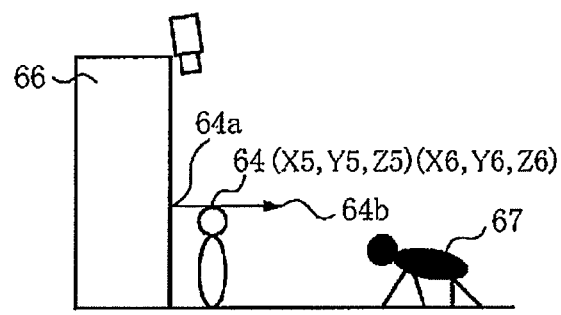

Thus, at step S6, the second virtual straight line 64 is provided, whose base end 64a is set at the coordinates (X5, Y5, Z5), i.e., the intersection point of the first straight line 63 and the face of the wall 66, and whose tip end 64b is set at the coordinates (X6, Y6, Z6), as shown in FIG. 5B. Of course, the second virtual straight line 64 is also a virtual line, and is not displayed on the display screen 61.

Figure 5C:
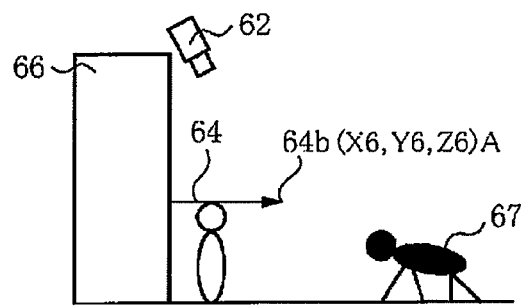

Next, it is determined whether the second virtual straight line intersects with obstacles such as a wall at step S7. Here, as the second virtual straight line does not intersect with any obstacles in the situation of FIG. 5B, it is determined to be "NO" at step S7. Then, the processing proceeds from step S7 to step S8, and the point of gaze is set at the tip end 64b of the second virtual straight line 64. That is, at step S8, the angle of the virtual camera 62 is controlled so that the coordinates (X6, Y6, Z6) should be set as the point of gaze A as shown in FIG. 5C.

Figure 1B:
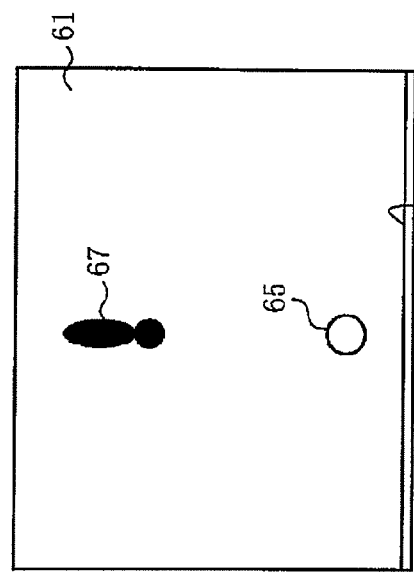
FIGS. 1B and 1B' are diagram showing an effect according to an embodiment of the invention.
Figure 1A:
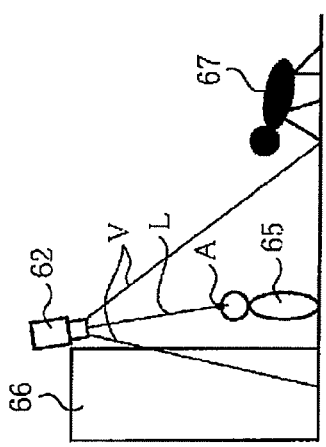
Figure 1B:
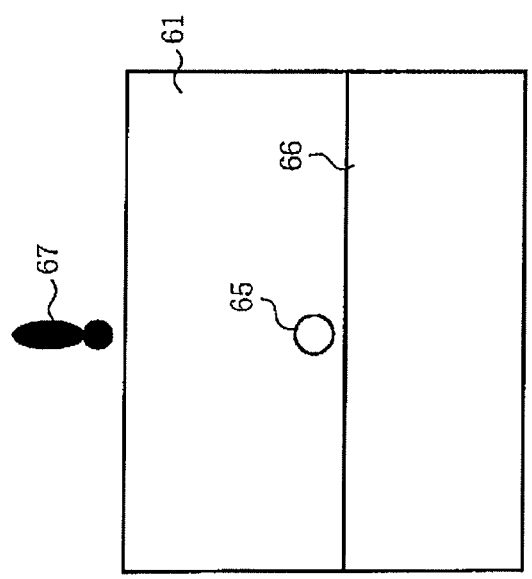

As a result of the angle of the virtual camera 62 being controlled as above, the tilt angle of the visual axis L becomes larger than the tilt angle of the visual axis in normal times as shown in FIG. 1B. Further, as the tilt angle of the visual axis L of the virtual camera 62 becomes larger as above, the tilt angle of the visual field V of the virtual camera 62 becomes larger accordingly. As a result, the enemy character becomes within the visual field V. Thus, both the player character 65 and the enemy character 67 are displayed on the display screen as shown in FIG. 1B'.

Accordingly, when the player character comes closer to an obstacle, there is no need to switch the virtual camera used in normal times to another virtual camera. Therefore, it is possible to prevent the image processing from becoming complicated as result of the utilization of multiple virtual cameras.

Figure 5D:
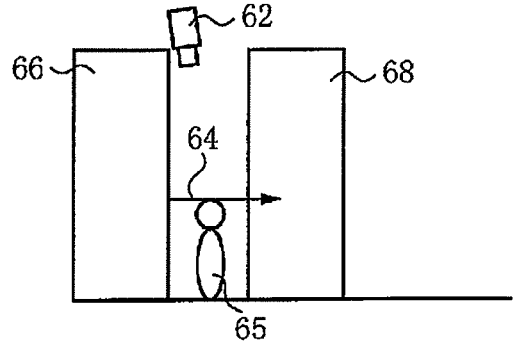

On the other hand, when the player character 65 exist between the wall 66 and another wall 68 as shown in FIG. 5D, the second virtual straight line 64 intersects with the obstacle, i.e., the other wall 68. In this case, it is determined to be "YES" at step S7, and the processing proceeds from step S7 to step S9.

Then, at step S9, the point of gaze set at the coordinates of the intersection point of the second virtual straight line 64 and the face of the obstacle, i.e., the wall 68. That is, because the second virtual straight line storage section 122d stores the coordinates (X5, Y5, Z5) of the base end 64a of the second virtual straight line 64 and the coordinates (X6, Y6, Z6) of the tip end 64b, the coordinates of the intersection point of the second virtual straight line 64 and the face of the obstacle.

Figure 5E:
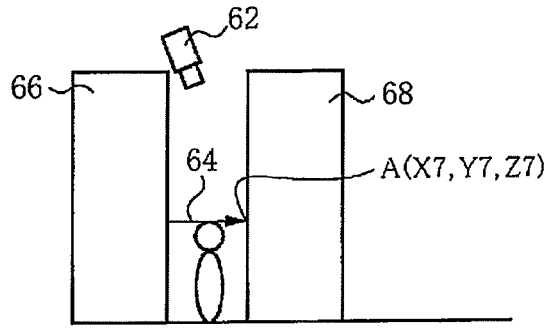

Thus, at step S9, the angle of the virtual camera 62 is controlled so that the coordinates (X7, Y7, Z7) of the intersection point of the second virtual straight line 64 and the other wall 68 is set as the point of gaze A, as shown in FIG. 5E. In this case, the tilt angle of the virtual camera 62 is smaller than the tilt angle of the virtual camera shown in FIG. 5C, and therefore it is possible to prevent the other wall 68 from occupying the range the visual field V too much.

The length of the virtual straight lines is set "three meters" in the present invention, however, the "three meters" is just an exemplary value, and any virtual lines having the length of proper value should be applied. The length may be calculated by the forgoing equation. Further, although the PC coordinates is set at the coordinates (X2, Y2, Z2) of the top of the player character 65 in the embodiment described heretofore, the coordinates of other position such as the central position of the player character 65 may be used. Further, other position coordinates relating to the player character 65 may also be used.

Further, when it is determined to be "YES" at step S7, the processing of step S9 is executed in the embodiment described heretofore, however, the processing may proceed to step S5 without executing the processing at step S9, so that the PC coordinates should be set as the point of gaze.

Furthermore, in the embodiment described heretofore, the programs and data are stored in the CD-ROM, and the CD-ROM is used as a recording medium. However, the recording medium is not limited to the CD-ROM, and other computer-readable magnetic or optical recording medium such as a digital versatile disc (DVD) or a semiconductor memory may be used. Further, the programs and data for implementing the present invention may be installed in advance on a storage device of a game apparatus or a computer.

Furthermore, the programs and data for implementing the present invention may be downloaded by the communications interface 17 shown in FIG. 2 from other apparatuses connected via the communications line 19 on the network 20. Also, the programs and data may be stored in memories of other apparatues on the communications line 19, and the programs and data stored therein may be sequentially stored and used in the RAM 12 as needed basis.

Furthermore, the programs and data for implementing the present invention may be provided as computer data signals superimposed on carrier waves from other apparatuses on the network 20. In this case, the communications interface 17 requests the other apparatuses on the network 20 to transmit the computer data signals via the communications line 19, and receives the transmitted computer data signal to be stored in the RAM 12. Such the programs and data stored in the RAM 12 may be used for implementing the present invention in the game apparatus 1.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope and spirit of the disclosure. Additionally, the illustrations are merely representational and are not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

An Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the scope and spirit of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed is:

1. An image generating apparatus that generates an image of a virtual three-dimensional space of a visual field of a virtual camera while having a point of gaze of the virtual camera follow a player character that moves in accordance with an operation input by a player, the image generating apparatus comprising:

a character mover that moves the player character in the virtual three-dimensional space in accordance with the operation input by the player;

a first virtual straight line setter that sets a first virtual straight line having a predetermined length and extending from a point of the player character in a predetermined direction in response to the character mover moving the player character;

a first determiner that determines whether the first virtual straight line intersects with an object other than the player character in the virtual three-dimensional space when the first virtual straight line setter sets the first virtual straight line;

a second virtual straight line setter that sets a second virtual straight line having the predetermined length and extending in an opposite direction than the predetermined direction of the first virtual straight line from an intersection point of the first virtual straight line and the object, when the first determiner determines that the first virtual straight line intersects with the object; and a controller that controls the virtual camera so that the point of gaze corresponds with an end point of the second virtual straight line, the end point being an end of the second virtual straight line opposite the intersection point of the first virtual straight line and the object from which the second virtual strain ht line extends.

2. The image generating apparatus according to claim 1, further comprising:

a second determiner that determines whether the second virtual straight line intersects with the object, wherein, when the second determiner determines that the second virtual straight line intersects with the object, the controller controls the virtual camera so that the point of gaze coincides with a second intersection point of the second virtual straight line and the object.

3. The image generating apparatus according to claim 1, wherein the intersection point is a point at which the first virtual straight line intersects with a first face of the object.

4. The image generating apparatus according to claim 1, wherein the controller controls the virtual camera so that the point of gaze coincides with a top of the player character in normal times when the first determiner determines that the first virtual straight line does not intersect with the object.

5. The image generating apparatus according to claim 1, wherein the object is an obstacle object other than the player character.

6. The image generating apparatus according to claim 1, wherein the predetermined length is set based on a height of the player character.

7. The image generating apparatus according to claim 1, wherein the controller sets the virtual camera so that the point of gaze is a predetermined distance above the end point of the second virtual straight line.

8. The image generating apparatus according to claim 7, wherein the predetermined distance is set based on a height of the player character and the predetermined length.

9. The image generating apparatus according to claim 1, further comprising:

a second determiner that determines whether the second virtual straight line intersects with a second object, wherein, when the second determiner determines that the second virtual straight line intersects with the second object, the controller controls the virtual camera so that the point of gaze coincides with a second intersection point of the second virtual straight line and the second object.

10. A non-transitory computer-readable recording medium including an image generating program executable by a computer of an image generating apparatus, the image generating program generating an image of a virtual three-dimensional space of a visual field of a virtual camera while having a point of gaze of the virtual camera follow a player character that moves in accordance with an operation input by a player, the image generating program causing the computer to function as:

a character mover that moves the player character in the virtual three-dimensional space in accordance with the operation input by the player;

a first virtual straight line setter that sets a first virtual straight line having a predetermined length and extending from a point of the player character in a predetermined direction in response to the character mover moving the player character;

a first determiner that determines whether the first virtual straight line intersects with an object other than the player character in the virtual three-dimensional space when the first virtual straight line setter sets the first virtual straight line;

a second virtual straight line setter that sets a second virtual straight line having the predetermined length and extending in an opposite direction than the predetermined direction of the first virtual straight line from an intersection point of the first virtual straight line and the object, when the first determiner determines that the first virtual straight line intersects with the object; and a controller that controls the virtual camera so that the point of gaze corresponds with an end point of the second virtual straight line, the end point being an end of the second virtual straight line opposite the intersection point of the first virtual straight line and the object from which the second virtual strain ht line extends.

11. The non-transitory computer-readable recording medium according to claim 10, wherein the predetermined length is set based on a height of the player character.

12. The non-transitory computer-readable recording medium according to claim 10, wherein the controller sets the virtual camera so that the point of gaze is a predetermined distance above the end point of the second virtual straight line.

13. The non-transitory computer-readable recording medium according to claim 12, wherein the predetermined distance is set based on a height of the player character and the predetermined length.

14. The non-transitory computer-readable recording medium according to claim 10, wherein the image generating program causes the computer to further function as comprising:

a second determiner that determines whether the second virtual straight line intersects with a second object, wherein, when the second determiner determines that the second virtual straight line intersects with the second object, the controller controls the virtual camera so that the point of gaze coincides with a second intersection point of the second virtual straight line and the second object.

15. An image generating method for generating an image of a virtual three-dimensional space of a visual field of a virtual camera while having a point of gaze of the virtual camera follow a player character that moves in accordance with an operation input by a player, the image generating method comprising:

receiving, via an interface, the operation input by the player;

moving, with a central processor, the player character in the virtual three-dimensional space in accordance with the operation received by the input;

setting, with the central processor, a first virtual straight line having a predetermined length and extending from a point of the player character in a predetermined direction in response to the player character being moved with the central processor;

determining, with the central processor, whether the first virtual straight line intersects with an object other than the player character in the virtual three-dimensional space when the first virtual straight line is set with the central processor;

setting, with the central processor, a second virtual straight line having the predetermined length and extending in an opposite direction than the predetermined direction of the first virtual straight line from an intersection point of the first virtual straight line and the object, when it is determined that the first virtual straight line intersects with the object;

controlling, with the central processor, the virtual camera so that the point of gaze corresponds with an end point of the second virtual straight line, the end point being an end of the second virtual straight line opposite the intersection point of the first virtual straight line and the object from which the second virtual straight line extends; and displaying, with a graphics processor, the image of the virtual three-dimensional space on a display in accordance with the point of gaze of the virtual camera.

16. The image generating method according to claim 15, wherein the predetermined length is set based on a height of the player character.

17. The image generating method according to claim 15, wherein the controller sets the virtual camera so that the point of gaze is a predetermined distance above the end point of the second virtual straight line.

18. The image generating method according to claim 17, wherein the predetermined distance is set based on a height of the player character and the predetermined length.

19. The image generating method according to claim 15, further comprising:

determining, with the processor, whether the second virtual straight line intersects with a second object, wherein, when it is determined that the second virtual straight line intersects with the second object, the processor controls the virtual camera so that the point of gaze coincides with a second intersection point of the second virtual straight line and the second object.

* * * * *

UNITED STATES PATENT AND TRADEMARK OFFICE
CERTIFICATE OF CORRECTION

PATENT NO.        : 8,704,851 B2  
APPLICATION NO.   : 12/241511  
DATED             : April 22, 2014  
INVENTOR(S)       : H. Saneshige Page 1 of 1

It is certified that error appears in the above-identified patent and that said Letters Patent is hereby corrected as shown below:

In the Claims

At Column 10, line 26 (Claim 1, line 32), "strain ht" should be -- straight --.

At Column 11, line 35 (Claim 10, line 35), "strain ht" should be -- straight --.

Signed and Sealed this  
Second Day of September, 2014

Michelle K. Lee  
*Deputy Director of the United States Patent and Trademark Office*